(No Model.)

3 Sheets—Sheet 1.

W. J. PERKINS.
SHINGLE SAWING MACHINE.

No. 463,234.          Patented Nov. 17, 1891.

WITNESSES
Franck L. Ourand
L. W. Bartlett

INVENTOR
Willis J. Perkins
By W. A. Bartlett
Attorney (No Model.)                    3 Sheets—Sheet 2.
W. J. PERKINS.
SHINGLE SAWING MACHINE.

No. 463,234.              Patented Nov. 17, 1891.

WITNESSES
F. L. Ourand.
L. M. Bartlett.

INVENTOR
Willis J. Perkins
By W. A. Bartlett
Attorney (No Model.) 3 Sheets—Sheet 3.
W. J. PERKINS.
SHINGLE SAWING MACHINE.
No. 463,234. Patented Nov. 17, 1891.
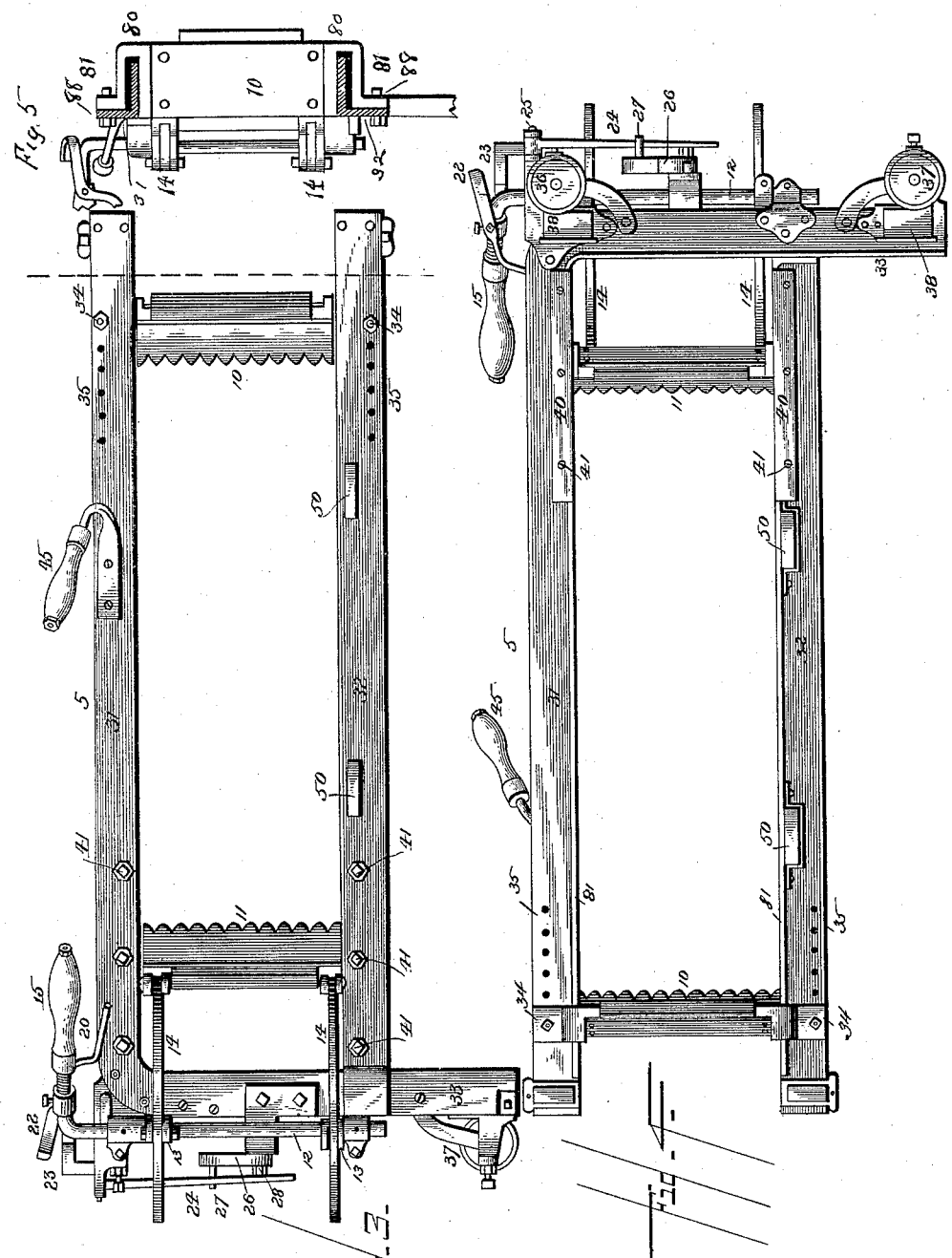
WITNESSES
F. L. Durand
L. M. Bartlett
INVENTOR
Willis J. Perkins
By W. H. Bartlett
Attorney

UNITED STATES PATENT OFFICE.

WILLIS J. PERKINS, OF GRAND RAPIDS, MICHIGAN.

SHINGLE-SAWING MACHINE.

SPECIFICATION forming part of Letters Patent No. 463,234, dated November 17, 1891.

Application filed January 17, 1890. Renewed June 20, 1891. Serial No. 396,896. (No model.)

*To all whom it may concern:*

Be it known that I, WILLIS J. PERKINS, residing at Grand Rapids, in the county of Kent and State of Michigan, have invented certain new and useful Improvements in Shingle-Sawing Machines, of which the following is a specification, reference being had therein to the accompanying drawings.

This invention relates to shingle-sawing machines of the kind in which the shingle-bolt is supported in a carriage which is pushed toward and drawn away from the saw by the direct application of manual power.

The object of the invention is to produce a machine in which the carriage may be made to move the least possible distance for the work in hand, and in which the tilting of the block may be accomplished at a minimum expenditure of power and with greater convenience to the operator; also in, general, to improve the frame, carriage, dogs, and tilt-operating train of mechanism of this class of machines.

Figure 1:
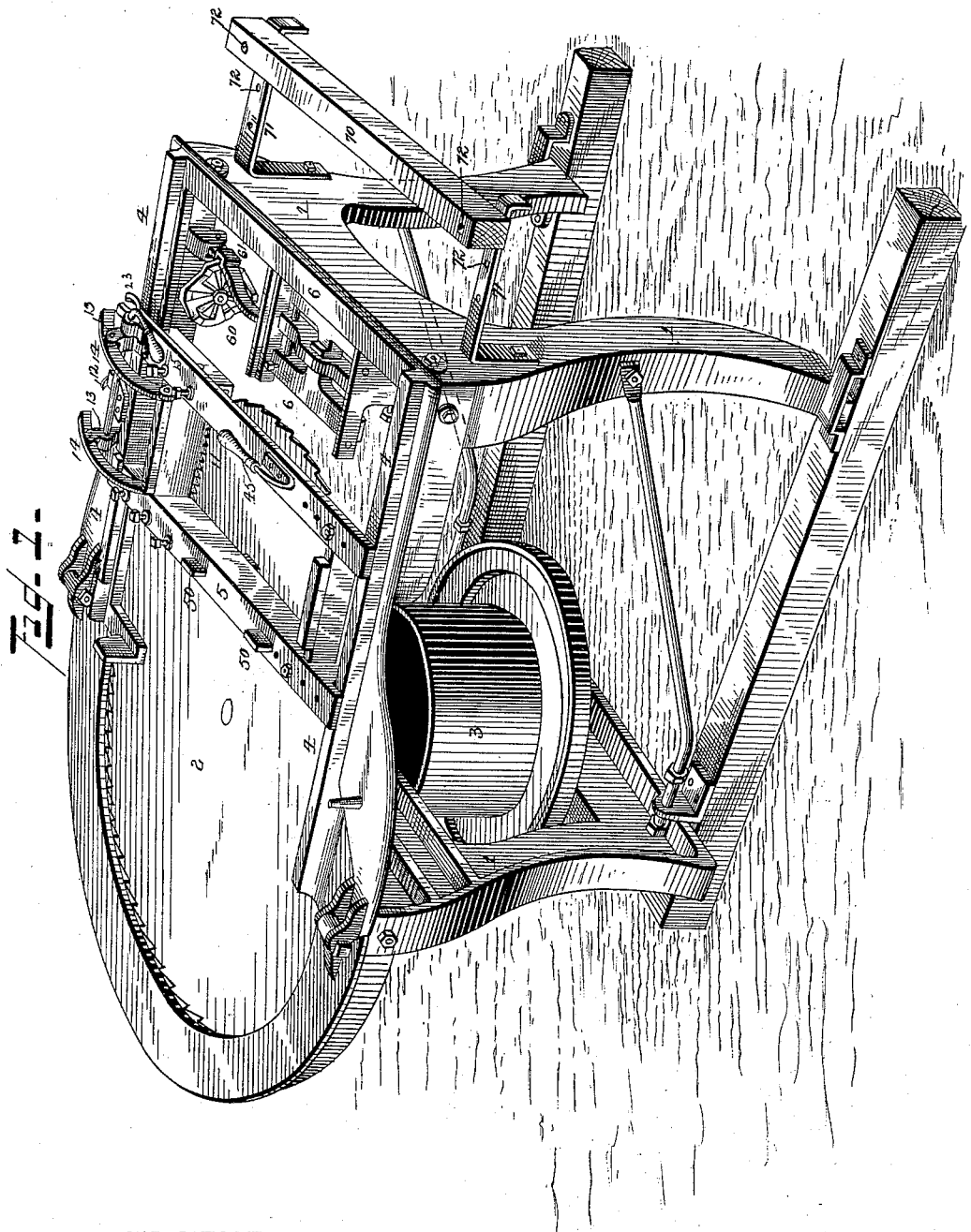
Figure 2:
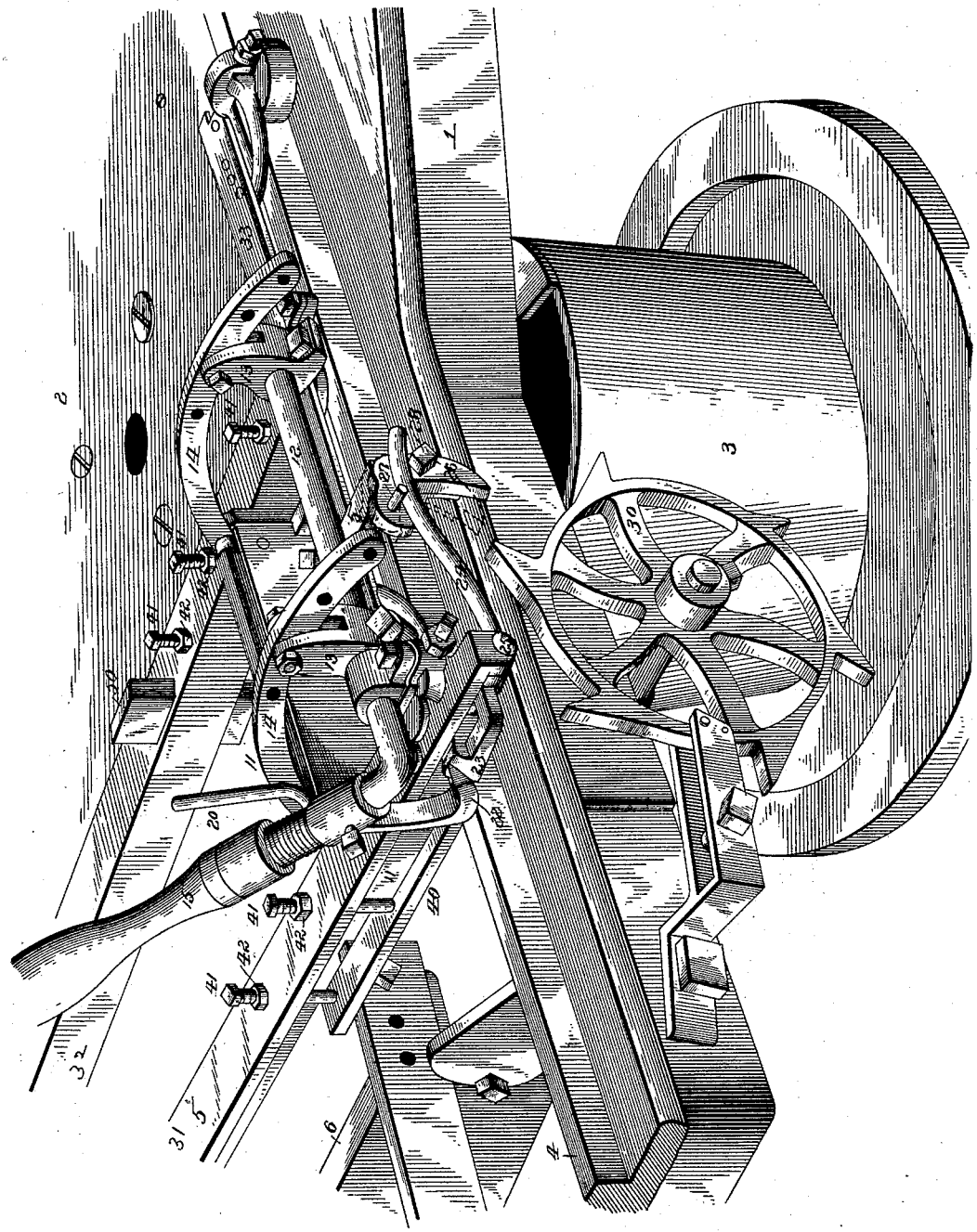

Figure 1 is a perspective view of a shingle-machine containing my improvements. Fig. 2 is an enlarged broken perspective of part of the machine, showing one end of the carriage and the dogs, taken from the opposite side of the machine from Fig. 1. Fig. 3 is a top plan of the carriage and dogs detached from the frame, and Fig. 4 is a bottom plan of the mechanism shown in Fig. 3; Fig. 5, a section of carriage.

The numeral 1 indicates the frame of the machine. This frame supports the saw 2 and its driving arbor and pulley 3. The frame has guides or slideways 4 4, on which ways the bolt-carriage 5 moves toward the saw in sawing a shingle and away from the saw to permit the block to be tilted on the tilt-table 6.

The shingle-bolt is held in the carriage between the so-called "fixed" dog 10 and the movable dog 11, as usual. The dog 11 is moved toward or away from dog 10 by the rocking of shaft 12. Shaft 12 is rocked by means of handle 15, attached to said shaft. The rock-shaft 12 has crank-arms 13 fixed thereto, and these arms 13 are connected by links 14 to the movable dog 11.

The dog-operating lever or handle 15 has a supplementary finger-lever, handle, trip, or catch 20, attached near the pivot of lever 15 and moving with said lever, but all the time moving one end in operative position to throw the tilt-train out of action, as will be explained. This catch 20 is in such relation to the main handle or lever 15 that the operator may actuate said catch by his thumb or finger without releasing his grasp of the main handle; but he is not compelled to actuate said catch in operating the handle. By drawing the handle or finger-piece 20 toward the main handle 15 the end 22 of the said finger-piece is drawn in toward the carriage-frame. When so drawn in, this engaging piece or end 22 comes in contact with the outer end 23 of the lever 24, which lever is pivoted to the carriage by the pin 25. The pawl 26 is pivoted to and carried by carriage 5. This pawl is free to rock into the position shown in dotted lines, Fig. 2, when moving toward the saw, but will engage a tooth on ratchet-wheel 30 when moving away from the saw, unless held out of engagement therewith, as hereinafter explained. When the operator with his finger draws in the handle or finger-piece 20, the end 22 of this finger-lever engages end 23 of lever 24 and lifts said piece 24. The lever 24 engages a pin 27 on pawl or engaging-piece 26 and rocks said pawl to the dotted position, Fig. 2. In that position the pawl will not engage the teeth of ratchet-wheel 30, and the tilt will not be operated by said ratchet-wheel 30. When released, the lever 24 is shown resting on the head 28 of the pivot of pawl 26.

The tilt-operating train may be any of the usual or suitable mechanisms employed in machines of this class. The ratchet-wheel 30, connected with and forming part of such a train, has been before known. In the drawings I show a double-face cam 60, secured to the shaft of ratchet-wheel 30 and operating on a draw and push rod 61 to work the tilt-table, the same being a well-known construction.

I have explained a convenient construction by which my purpose of throwing or leaving the tilter out of operation may be accomplished.

As my purpose is to leave it optional with the operator whether the tilt shall be operated or not and with the least exertion, it is obvious that changes of construction involving mechanical equivalents may readily be made without further invention.

The frame of carriage 5 is formed of two side bars 31 32, one of these bars being elongated and bent at a right angle and prolonged at 33 past the side bar 32. The so-called "fixed" dog 10 is bolted on the side bars and can be moved by taking out the bolts 34, which extend through the ends of the plate of dog 10, and replacing the bolts in other holes 35 in the carriage-frame. The elongated end 33 of the fourth side of the rectangular carriage projects some little distance beyond the bar 32, to which bar it is firmly secured in any usual way. The carriage is thus a rectangle with one side prolonged. This elongated side, as shown, carries the anti-friction rolls 36 and 37, one of said rolls 37 being outside the line of the bar 32. These rolls and the blocks 38 on the under side of the carriage constitute the bearings of the carriage on one of the guideways 4 of the frame. The rolls 36 and 37 are adjustable toward the guide-rail to take up wear in a manner well known in the art. By reason of the elongated side piece 33 the carriage is much less likely to bind in its bearings than if made simply a rectangle, as is usual. The movable dog 11 is guided between the side bars 31 and 32 and lower bearing-plates 40 40, which are attached to said side bars by screw-bolts 41, the bolts 41 extending through the top of bars 31 32 and being held by lock-nuts 42. The plates 40 may be adjusted by means of these bolts to take up wear on the dog 11.

The carriage is operated by one hand grasping the handle 15 and the other the handle 45. The dog 11 is held against the shingle-bolt by the operator bearing on handle or lever 15. When the carriage is drawn away from the saw, the pawl 26 will habitually engage the ratchet-wheel 30 and shift the tilt-table 6, so that when the shingle-bolt is dropped onto said table preparatory to taking a new cut the shingle-bolt will be tilted to alternately cut butts and points; but if it is desirable to cut a number of butts successively from one end of the bolt the operator will press his finger on lever 20, when the carriage will move back without operating the tilt-table, and a succeeding cut will have the point in the same direction as the last. The wooden blocks 50 pass tightly down through mortises in the side bar of the carriage next the saw and rest on the upper surface of the saw when the carriage is pressed forward. The frame is made narrow to cut narrow shingles and to do so with less travel than would be necessary with the usual wide carriage, thus reducing the labor of the operator.

The frame 1 has a pair of brackets 71, arranged at one end, and a body or leg rest or support 70 is attached to these brackets, said rest being adjustable on the brackets, as by bolts 72 passing through the piece 70 and the brackets. The piece 70 can be adjusted nearer or farther from said frame 1, as advisable. Piece 70 usually bears a cushion against which the sawyer rests his body and grasps handle 15 with his right hand and handle 45 with his left, so as to conveniently push the carriage toward and draw it away from the saw. The dog 10 forms the cross-bar constituting one end of the carriage-frame. The side bars 31 32 are of angle-iron or steel, and the ends 80 of the dog turn up around the legs 81 of the side bars and are secured to the other legs or flanges of said angle-bars by bolts 88 or similar fastenings. The bars are thus firmly held and the dog braced without employing space inside the side bars for securing devices or weakening the side bars by cutting.

I do not confine myself, generally, to the precise construction shown, as I intend to employ equivalents.

What I claim is—

1. In a shingle-sawing machine, the combination, with the reciprocating bolt-holding carriage, of a catch in position to be reached by the hand of the operator while resting on the carriage, an engaging-piece operated thereby to disconnect the tilt operating-train, and a train of tilting mechanism normally operated by the reciprocation of the carriage, substantially as described.

2. In a hand shingle-machine, the combination, with the reciprocating bolt-holding carriage, of a lever in position to be reached by the hand of the operator, a pawl carried by the carriage, an intermediate lever engaging said first-mentioned lever and engaging said pawl, and a ratchet-wheel connected to the tilt and in position to be operated by the pawl when not thrown out of operative position, substantially as described.

3. The combination, with the dog-operating lever of a shingle-carriage, of a trip carried thereby in such position as to be in reach of the hand of the operator and in operative position in all positions of the dogging-lever, a tilt-disengaging piece 23 24, and a tilting train under control of said catch on the carriage, substantially as described.

4. The combination, with the reciprocating carriage, of a trip carried thereby, a tilt-operating pawl under control of said trip, and a tilt-operating train on the frame in position to be operated by said pawl when not thrown out by the trip.

5. In a shingle-sawing machine, a reciprocating carriage, a movable dog thereon operated by a hand-lever, a finger-lever in position to be engaged by the hand of the operator while holding the dogging-lever, and a tilt-operating train under control of this finger-lever, whereby the operator may control the tilt mechanism with one hand and without releasing the dogging-lever, in combination, substantially as described.

6. In a shingle-sawing machine, a reciprocating carriage, a dogging-lever thereon, a finger-catch pivotally supported on said dogging-lever, an intermediate lever controlled by said finger-lever, a pawl engaged by said intermediate lever to be thrown out of operative position, and a tilt-operating ratchet-wheel in the path of movement of said pawl, all in combination, substantially as described.

7. In a shingle-sawing machine, the combination of the carriage, a rock-shaft thereon connected to the movable dog, a handle on said rock-shaft and a finger-lever pivoted to said handle, a pawl operated by a connection from said finger-lever to be thrown out of engaging position, and a ratchet-wheel on the frame operatively connected to the tilt-table and normally engaged by said pawl, all substantially as described.

8. The combination, with the reciprocating carriage, of two handles, a tilt-train normally operated by the carriage, and a disconnecting-train within reach of one of the handles, whereby the operator may cause the machine to omit the operation of the tilt without releasing either handle of the carriage.

9. The combination, with the frame of a shingle-machine having guideways thereon, of a rectangular carriage reciprocating on said ways, said carriage having a guide-bar extending in the direction of the guideways beyond the side bars of the carriage and having bearings on said guideways, substantially as described.

10. A shingle-bolt carriage-frame having two side bars, one of which is bent at a right angle and is prolonged across the other bar and secured thereto, said bar having bearings on its prolongation outside the carriage proper to ride on the guideways of the carriage, substantially as described.

11. The combination, with the guideways of a shingle-machine, of a rectangular carriage having a bar prolonged beyond the body of the carriage proper and parallel with the ways, and bearing on said ways at the extreme ends of said prolonged bar, substantially as described.

12. The combination, with the frame of a shingle-machine having a horizontal saw and horizontal guideways for the carriage, of brackets secured at the front end of said frame, and a body-rest adjustably secured to the brackets, so as to be movable to various positions nearer to or farther from the frame, substantially as described.

13. The combination, with the angle-bars of a shingle-saw carriage, of a dog extending between the bars and forming one end of the carriage, said dog being turned up around one of the legs of the angle-bar and fastened to the other leg of said bar, substantially as described.

In testimony whereof I affix my signature in presence of two witnesses.

WILLIS J. PERKINS.

Witnesses:
W. A. BARTLETT,
PHILIP F. LARNER.